US010328980B2

(12) United States Patent
Morrison et al.

(10) Patent No.: US 10,328,980 B2
(45) Date of Patent: Jun. 25, 2019

(54) PASSIVE PRESSURE DRAG REDUCTION APPARATUS

(71) Applicant: Imperial Innovations Limited, London (GB)

(72) Inventors: Jonathan Morrison, London (GB); Anthony Oxlade, London (GB); Juan Marcos Garcia De La Cruz Lopez, London (GB)

(73) Assignee: Imperial Innovations Limited, London (GB)

( * ) Notice: Subject to any disclaimer, the term of this patent is extended or adjusted under 35 U.S.C. 154(b) by 3 days.

(21) Appl. No.: 15/736,827

(22) PCT Filed: Jun. 10, 2016

(86) PCT No.: PCT/GB2016/051740
§ 371 (c)(1),
(2) Date: Dec. 15, 2017

(87) PCT Pub. No.: WO2016/203209
PCT Pub. Date: Dec. 22, 2016

(65) Prior Publication Data
US 2018/0162457 A1 Jun. 14, 2018

(30) Foreign Application Priority Data
Jun. 16, 2015 (GB) .................................. 1510497.9

(51) Int. Cl.
*B62D 35/00* (2006.01)
(52) U.S. Cl.
CPC .................................. *B62D 35/001* (2013.01)

(58) Field of Classification Search
CPC ... B62D 35/001; B62D 35/002; B62D 35/007
USPC ....................................................... 296/180.4
See application file for complete search history.

(56) References Cited

U.S. PATENT DOCUMENTS

| 4,682,808 A * | 7/1987 | Bilanin ................ B62D 35/001 |
| | | 296/180.4 |
| 4,902,066 A | 2/1990 | Norman |
| 6,286,892 B1 | 9/2001 | Bauer et al. |
| 7,854,468 B2 * | 12/2010 | Vogel ................... B62D 35/001 |
| | | 296/180.1 |

(Continued)

OTHER PUBLICATIONS

PCT Patent Application PCT/GB2016/051740 International Search Report and Written Opinion to Applicant Imperial Innovations Limited dated Aug. 10, 2016.

(Continued)

*Primary Examiner* — Gregory A Blankenship
(74) *Attorney, Agent, or Firm* — Erise IP, P.A.

(57) ABSTRACT

The disclosure provides a passive pressure drag reduction apparatus. The apparatus comprises a housing (106) comprising a base face (114), an open top face (110) opposite the base face and at least one side face (108) extending between the base face and the top face, wherein the base face, the top face and the at least one side face define a cavity (102). A panel (112) is aligned with the top face of the housing, and there is provided an aperture (104) extending around the panel, wherein the cavity is in fluid communication with an environment surrounding the apparatus via the aperture. Further, attachment means are provided arranged to secure the panel to the housing.

11 Claims, 10 Drawing Sheets

(56) References Cited

U.S. PATENT DOCUMENTS

| | | | |
|---|---|---|---|
| 8,083,284 B1 | 12/2011 | Logounov | |
| 8,622,462 B2* | 1/2014 | Ryan | B62D 35/004 |
| | | | 296/180.4 |
| 2002/0030384 A1 | 3/2002 | Basford | |
| 2003/0011210 A1 | 1/2003 | Cory | |
| 2007/0176465 A1 | 8/2007 | Wood | |
| 2008/0303310 A1* | 12/2008 | Breidenbach | B62D 35/001 |
| | | | 296/180.2 |
| 2009/0026797 A1* | 1/2009 | Wood | B62D 35/001 |
| | | | 296/180.1 |
| 2009/0212598 A1 | 8/2009 | Otterstrom | |
| 2011/0221231 A1 | 9/2011 | Visser et al. | |
| 2016/0068201 A1* | 3/2016 | Breidenbach | B62D 35/001 |
| | | | 296/180.4 |
| 2018/0162457 A1* | 6/2018 | Morrison | B62D 35/001 |

OTHER PUBLICATIONS

Great Britain Patent Application 1510497.9 Combined Search and Examination Report to Applicant Imperial Innovations Limited dated Dec. 17, 2015.

\* cited by examiner

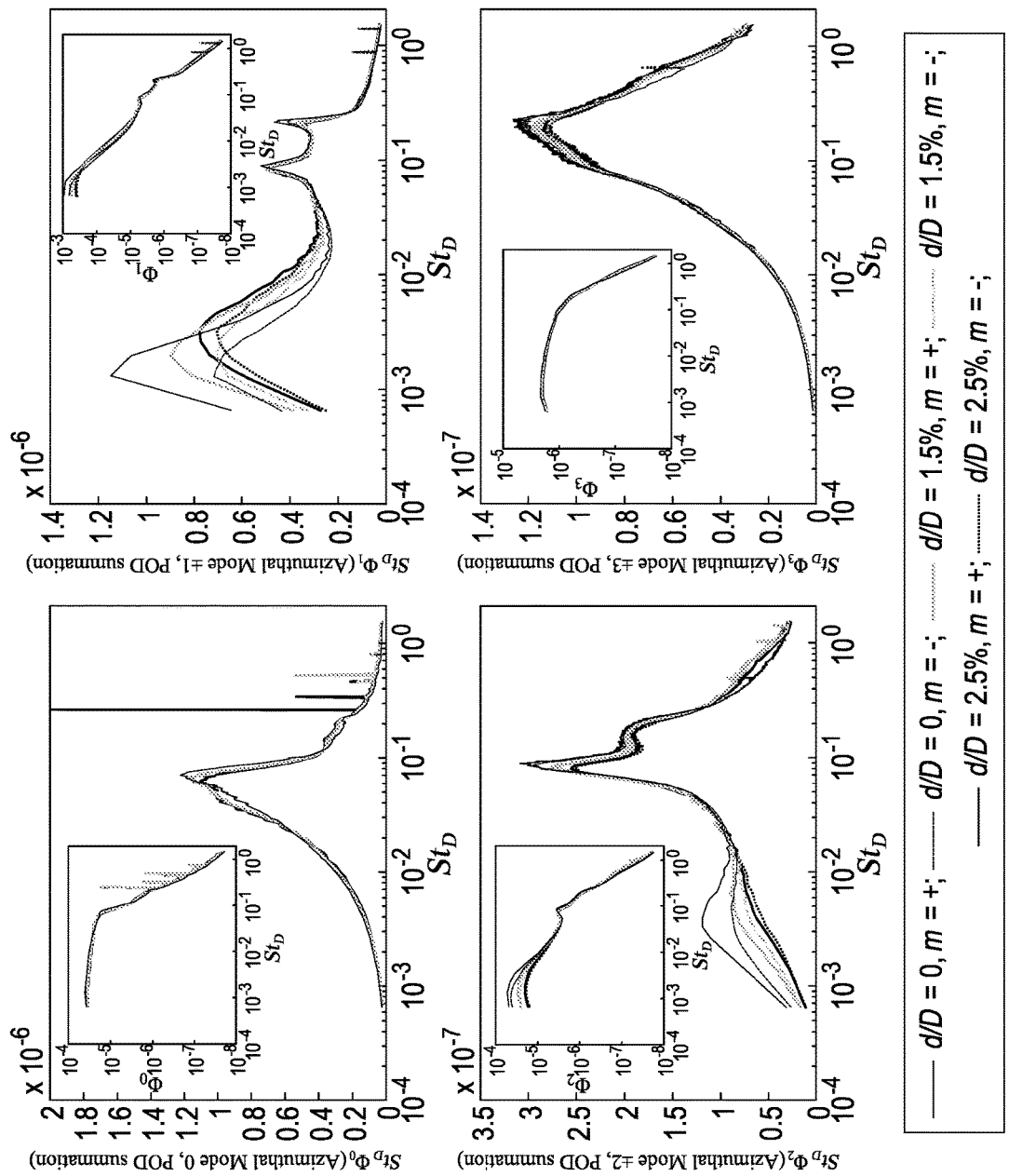

PASSIVE PRESSURE DRAG REDUCTION APPARATUS

RELATED APPLICATIONS

The present application is a national stage application under 35 U.S.C. § 371 of International Application No. PCT/GB2016/051740, filed 10 Jun. 2016, and which claims priority from GB Patent Application No. 1510497.9, filed 16 Jun. 2015. The above-referenced applications are hereby incorporated by reference into the present application in their entirety.

FIELD OF THE INVENTION

This invention relates to the field of drag reduction. In particular, this invention relates to a passive apparatus for reducing pressure drag and a vehicle comprising the passive pressure drag reduction apparatus.

BACKGROUND

The drag experienced by a vehicle at speed is the largest contributor to that vehicle's fuel consumption. If the drag force on a vehicle can be reduced, the amount of fuel required to run the vehicle will be less, thereby reducing both the running costs for the vehicle and the environmental damage caused by the burning of said fuel.

When a vehicle is moving, the air it travels through causes the vehicle to experience a drag force. This aerodynamic drag has two main components: friction drag and pressure drag. The first component, friction drag, arises because, as the vehicle moves through the air, the air nearest the vehicle adheres to the surface of the vehicle and travels with it. Friction then occurs between this air and the layers of air through which the vehicle is moving, producing the frictional component of the drag force. This air around the vehicle which contributes to the frictional drag is called the boundary layer. The thickness of the boundary layer, and whether it is laminar or turbulent, varies along the length of the vehicle and is dependent on parameters such as the viscosity of the air and the velocity and geometry of the vehicle.

Pressure drag is caused by the difference in pressure on the forward facing surface of a vehicle (i.e. the surface which is moving into the air when the vehicle is in motion) and on the backward facing surface of the vehicle. The forward facing surface will hereafter be referred to as the front of the vehicle, and the backward facing surface will hereafter be referred to as the back or rear of the vehicle. The lower the pressure at the rear of the vehicle as compared to the front, the greater the pressure drag force which opposes the motion of the vehicle. The pressure at the rear of the vehicle is affected by the type of air flow behind the vehicle; for example, large turbulent wakes may lead to a higher pressure differential than smaller wakes. Whilst reducing the strength of the wake behind the vehicle through streamlining of the vehicle decreases the contribution of pressure drag to the overall drag force, streamlining also increases the contribution from friction drag, as the wetted area of the vehicle increases.

A bluff body is a body for which the aerodynamic drag is dominated by pressure drag (for example, a lorry, truck, large goods vehicle (LGV), van or 4×4), whereas the drag on a streamlined body (for example, an aeroplane) is dominated by friction drag. A bluff body typically has a high contribution from pressure drag because the boundary layer can- not easily follow the contours of the body and thus separates from the body rather than continuing to adhere to its surface. As the air flow separates from the bluff body, eddies and vortices form and create a wake. For an articulated lorry, pressure drag can be as much as 90% of the total aerodynamic drag. Therefore, reducing the pressure drag is important for reducing the fuel costs for bluff body vehicles such as LGVs and trucks.

As discussed above, pressure drag is proportional to the pressure difference between the front and rear of a bluff body. For a moving vehicle, the pressure difference is equal to the pressure on the front of the vehicle due to the air it is moving into minus the pressure on the opposite, rear, end of the vehicle. Therefore, there are three ways of reducing the pressure drag of a vehicle, or other bluff body: reducing the pressure at the front of the vehicle, increasing the pressure at the rear of the vehicle, or a combination of the two.

WO 2014/016618 provides an example of an active apparatus for reducing pressure drag comprising oscillating means arranged to draw in and eject fluid from a cavity. The ejected fluid entrains fluid from the environment in order to increase the pressure at the rear of a vehicle comprising the apparatus, and thus reduce the pressure drag.

SUMMARY

According to a first aspect of the present invention, there is provided a passive pressure drag reduction apparatus comprising:
 a housing comprising a base face, an open top face opposite the base face and at least one side face extending between the base face and the top face, wherein the base face, the top face and the at least one side face define a cavity;
 a panel aligned with the top face of the housing;
 an aperture extending around the panel, wherein the cavity is in fluid communication with an environment surrounding the apparatus via the aperture;
 attachment means arranged to secure the panel to the housing.

The passive pressure drag reduction apparatus of the present invention can reduce the effect of pressure drag on a bluff body. The apparatus has an efficient and economical architecture, as there are no moving parts or complicated electronics. Therefore, the apparatus can be economically produced and can contribute to reducing fuel consumption for bluff bodies such as trucks, vans and lorries without utilising further fuel to bring about the benefit of reduced pressure drag. As the apparatus may be manufactured relatively cheaply and the architecture of the apparatus may facilitate easy retrofitting of the apparatus to existing bluff bodies, the cost of the passive pressure drag reduction apparatus may be reduced.

In some preferred embodiments, the base face is rectilinear and the housing comprises four sides extending between the base face and the top face. This arrangement may facilitate easier coupling between the housing and a bluff body such as a truck or other good vehicle, as the vehicle and the housing have the same cross section. The housing may alternatively be of any other geometric cross section.

Preferably, the aperture has a width greater than or equal to 2% of the largest lateral dimension of the housing, more preferably greater than or equal to 2.5% of the largest lateral dimension. Preferably, the aperture width is greater than or equal to 3% of the largest lateral dimension of the housing. More preferably, the aperture has a width greater than or equal to 5% of the largest lateral dimension of the housing.

The lateral dimension may be a width, a height, or a diameter of the housing. This architecture may facilitate improved pressure drag reduction.

Optionally, the housing comprises a body of a bluff body and the panel is integrated within one or more doors of the bluff body. The doors may be rear doors of the bluff body. In this way, the passive pressure drag reduction apparatus can be formed using all or part of the interior volume of the bluff body as the cavity. This arrangement may be advantageous as it reduces the cost of the apparatus and does not increase the weight of the vehicle when the apparatus is used. This arrangement may reduce manufacturing costs. Further advantages may lie in the monetary savings and environmental benefits of the reduced fuel consumption brought about by the passive pressure drag reduction apparatus.

In a second aspect of the present invention, there is provided a vehicle comprising the passive pressure drag reduction apparatus. Preferably, the base face of the housing is arranged at a rear of the vehicle such that the side faces of the housing are substantially flush with edges of the rear of the vehicle. This architecture is advantageous because the aperture is then at the very edges of the bluff body, where air flow separates from the body. This region of the flow is most receptive to changes in the air pressure, although any region with pressure fluctuations can be receptive to changes in air flow.

The features described with reference to the first aspect of the present invention may be provided with the second aspect of the present invention. For example, when the passive drag reduction apparatus is coupled with a vehicle as in the second aspect of the invention, the housing may be of a rectilinear cross section, and the aperture may be greater than or equal to 2% of the largest lateral dimension of the housing, as described with reference to the first aspect of the present invention.

BRIEF DESCRIPTION OF THE DRAWINGS

Preferred embodiments of the present invention, including axisymmetric and rectilinear examples, will now be described with reference to the accompanying drawings in which:

FIG. 8 is an example of a graph showing the frequency distribution of the pressure variance for different azimuthal modes and different aperture widths;

DETAILED DESCRIPTION OF EXAMPLE EMBODIMENTS

Figure 1:
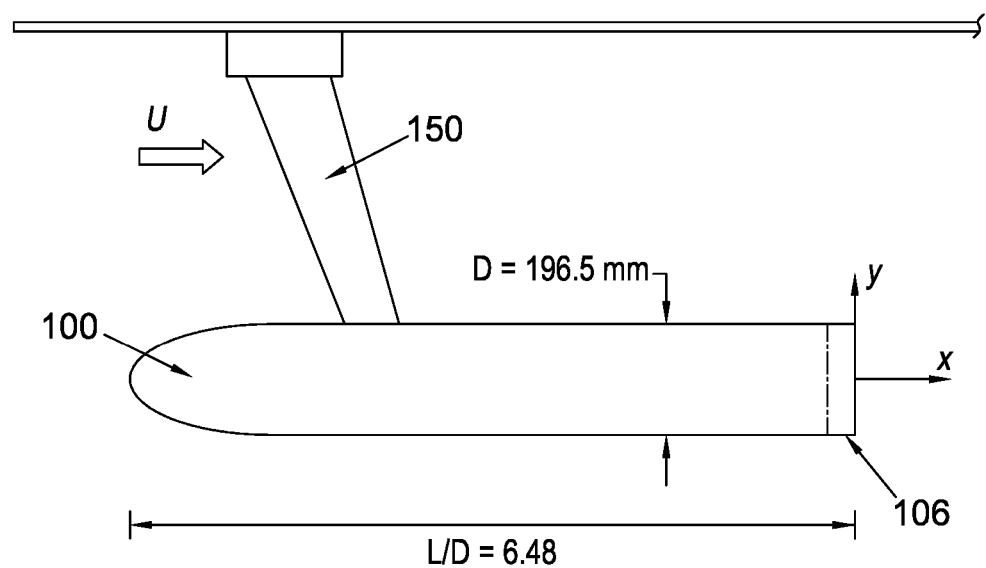
FIG. 1 shows a side view of a schematic of a bluff body and pressure drag reduction apparatus of a first embodiment of the present invention.
Figure 2A:
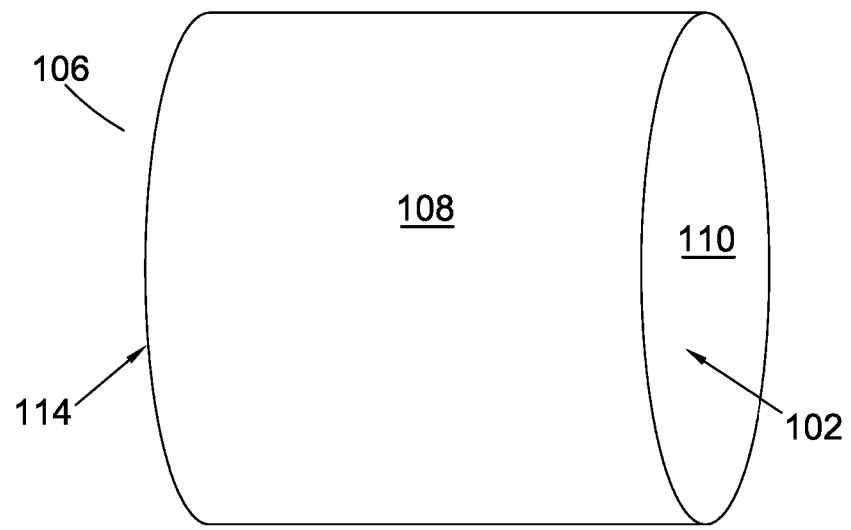
FIG. 2A shows a schematic of the housing of the pressure drag reduction apparatus of FIG. 1.
Figure 2B:
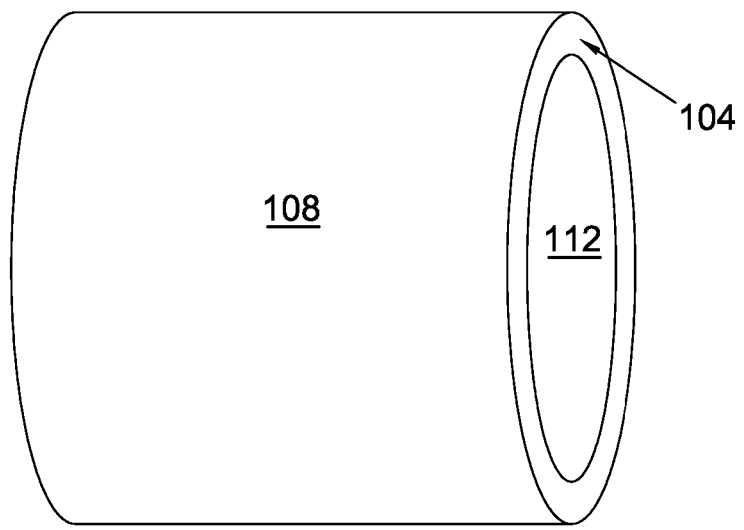
FIG. 2B shows a schematic of the forming of the aperture of the pressure drag reduction apparatus of FIG. 1.
Figure 3:
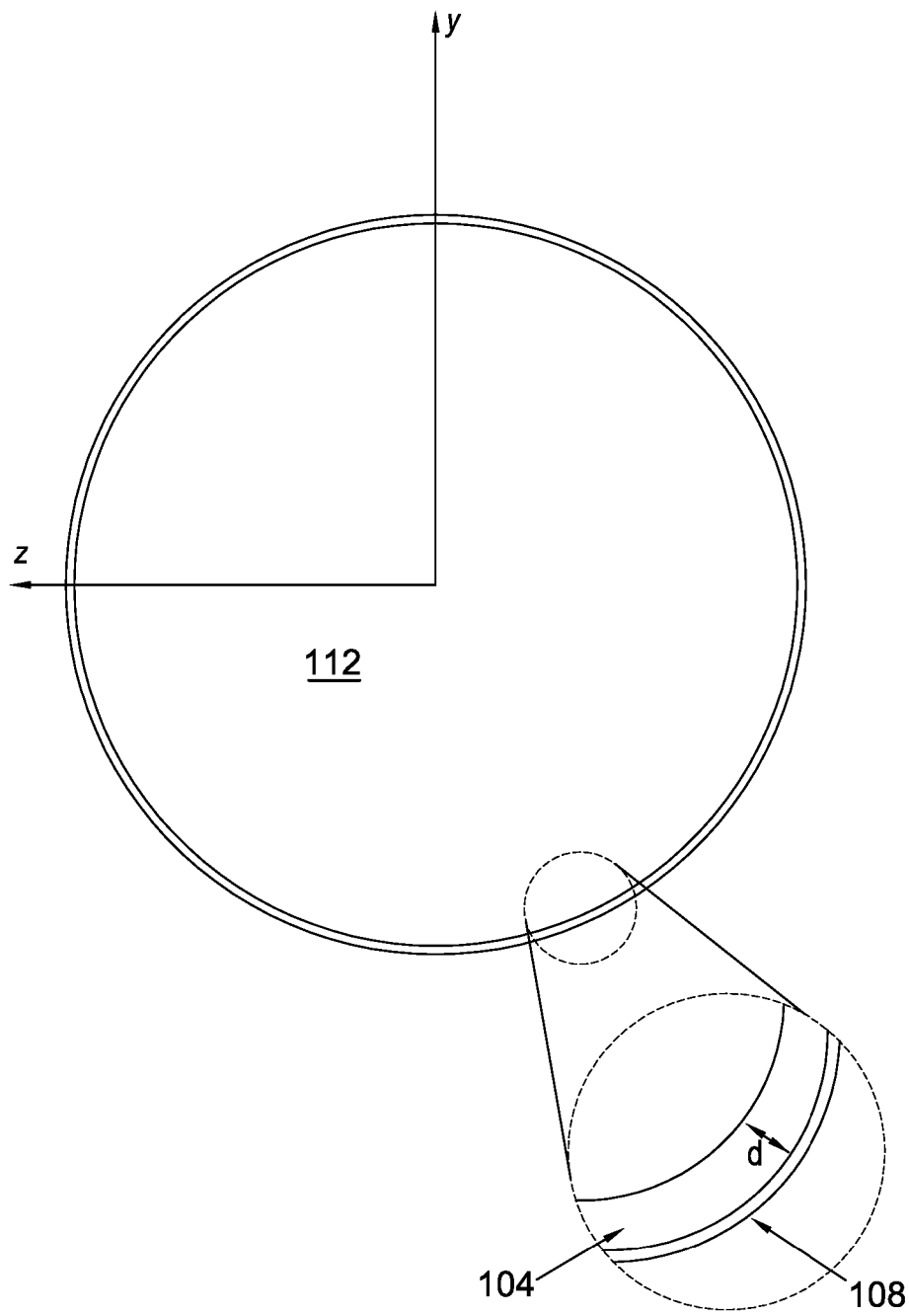
FIG. 3 shows a rear and detailed view of the bluff body and pressure drag reduction apparatus of the first embodiment of the present invention.

With reference to FIGS. 1 to 3, an axisymmetric bluff body 100 with a blunt trailing edge comprises a pressure drag reduction apparatus coupled to the trailing edge of the bluff body 100. The pressure drag reduction apparatus comprises a housing 106. The housing 106 comprises a base face 114, an open top face 110 and at least one side face 108 extending between the base face and the top face. The base face, side face or faces and top face of the housing 106 define a cavity 102. The volume of the cavity 102 is defined by the dimensions of the housing 106.

The pressure drag reduction apparatus further comprises a panel 112 that is aligned with the top face 110 of the housing 106. The panel 112 is secured to the housing 106 such that the panel 112 does not protrude beyond the at least one side 108 of the housing. Therefore, the panel 112 is not visible when the bluff body 100 and the housing 106 coupled to the bluff body 100 are viewed from the side, as shown in FIG. 1. The panel 112 is secured to the housing 106 by attachment means. The attachment means may be supporting wires, screws, bolts, or any other suitable means of connection.

In this embodiment, the bluff body 100 and housing 106 have circular cross sections of equal diameter, and the housing 106 is secured to the trailing edge of the bluff body such that the at least one side 108 of the housing is substantially flush to the bluff body 100. The panel 112 also has a circular cross section. The diameter of the panel 112 is less than the diameter of the top face 110, and the panel 112 is secured to the housing 106 such that there is a substantially equal distance between the edge of the panel 112 and the side 108 of the housing 106. In other embodiments, the housing may be of rectilinear cross section. The panel would then be rectangular or square in shape and preferably would be secured in the centre of the top face, such that each side of the panel is equidistant from the sides of the housing.

The space between the at least one side 108 of the housing 106 and the panel 112 defines an aperture or slit. The distance between the edge of the panel 112 and the side of the housing 106 defines the size or width, d, of the aperture 104. The aperture 104 extends around the panel 112. In this embodiment, the aperture 104 extends the entire perimeter of the panel 112 in a closed loop. However, the aperture 104 may be interrupted by the attachment means described above, or may not be a closed loop. The slit or aperture may also be of varying width, d, if the panel 112 is not concentric with the housing 106. However, the aperture 104 should extend around the perimeter of the panel 112, as turbulence in the regions of the housing with no slit or aperture may distort the pressure reduction in regions of the housing with the slit or aperture.

In embodiments where the bluff body is of a substantially rectilinear cross section, the aperture may follow a rectangular path around the perimeter of the panel 112. The aperture may extend the entire perimeter of the panel 112, or may be interrupted by attachment means. The width of the aperture is then determined as being between each side of the housing and each edge of the panel. The aperture may therefore have four different widths.

By following the contours of the geometry of the panel 112, the aperture 104 is at the edge of the housing 106. Because the housing 106 is flush with the bluff body 100, the aperture 104 is located immediately beneath the point at which the air flow separates from the trailing edge of the combined bluff body 100 and housing 106. This point is the most receptive to subtle changes in air conditions and therefore the passive pressure drag reduction apparatus can have maximum impact. However, other areas where there are pressure fluctuations are also receptive to such changes in air condition. Consequently, in other embodiments the aperture can be located at a position removed from the edge of the housing 106. For example, the top face may not be completely open, such that part of the housing may be located on the top face to form a rim or lip of housing around the perimeter of the top face. Therefore, when the panel is aligned with the top face, the aperture is not located immediately beneath the point at which the air flow separates from the trailing edge of the combined bluff body and the housing.

The cavity 102 and aperture 104 in combination both reduce wake oscillations behind the bluff body 100 and generally stabilise the wake. This increases the pressure behind the bluff body, decreasing the difference in pressure between the front and rear of the bluff body and thus reducing the effect of pressure drag. A 5% increase in the pressure behind the bluff body can potentially give a 2% reduction in drag, resulting in an estimated 1% saving in fuel for a bluff body such as a large goods vehicle (LGV). Reducing wake oscillations also reduces the variance in the pressure at the edges of the bluff body. This can lead to a reduction in the vibrations of the body and a reduction in noise generation.

Figure 4A:
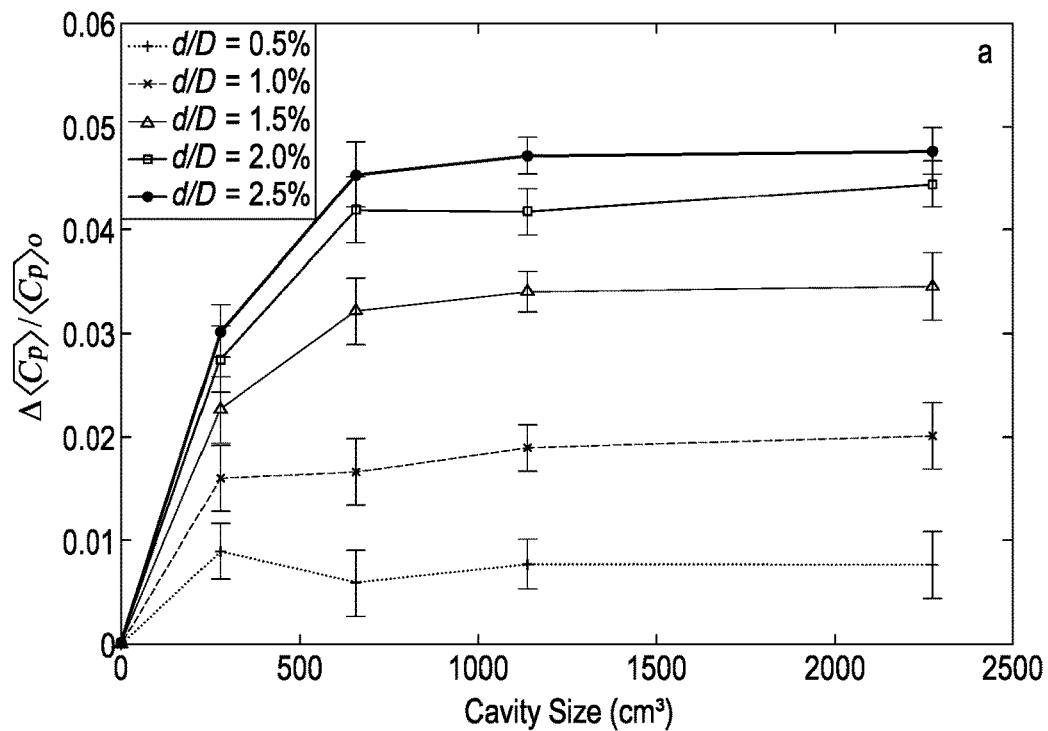
FIG. 4A is an example of a graph showing the correspondence between an increase in cavity volume and a reduction in the pressure drag for a range of different aperture widths.
Figure 4B:
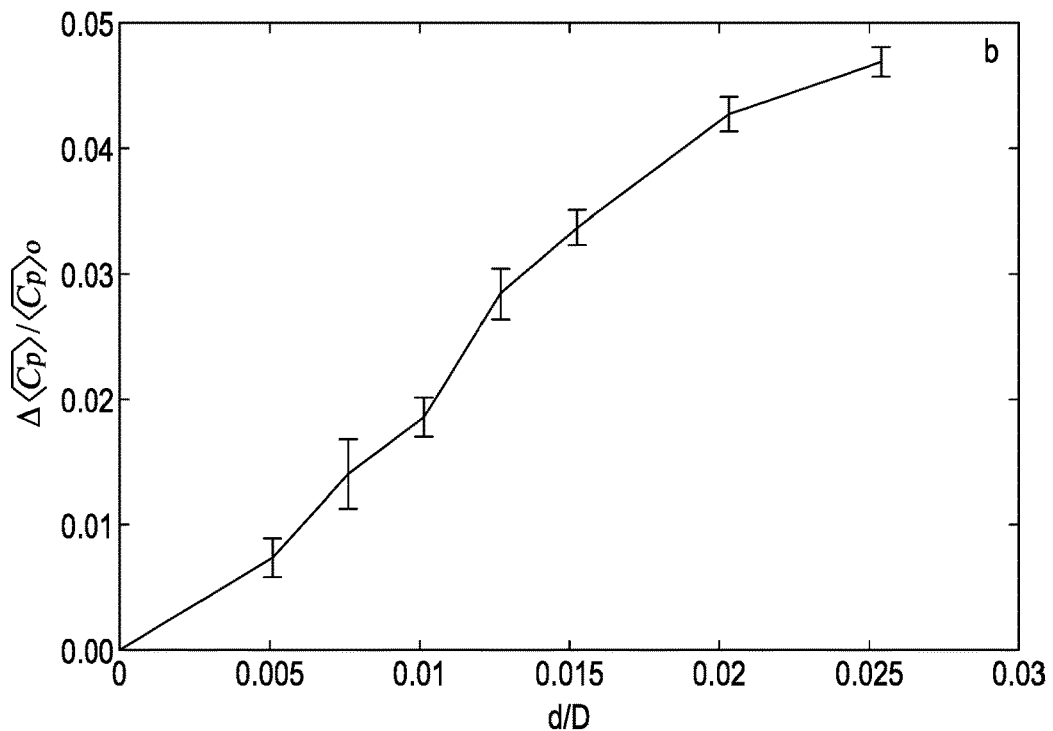
FIG. 4B is an example of a graph showing the correspondence between an increase in pressure at the rear of the bluff body and the aperture width.

FIGS. 4a and 4b show the effect of varying the width, d, of the aperture 104 and the volume of the cavity 106 (or the cavity size) on the pressure coefficient, $C\_p$, for the axisymmetric bluff body shown in FIG. 1. A boundary layer momentum thickness of $\theta=2.14$ mm at flow separation was measured for the bluff body at a free stream speed of U=15 m/s. The diameter of the bluff body D is used to scale the width of the aperture in the following Figures. The diameter of the axisymmetric bluff body of this exemplary embodiment was D=196.5 mm and the length was L=6.48D mm. The bluff body 100 is supported by an aerofoil with a thickness of 11 mm (feature 150 of FIG. 1). The change in the average pressure coefficient, $<\Delta C\_p>$ is normalised by the average pressure coefficient for a slot of width d=0 mm.

It can be seen that for each aperture width, d, the normalised average rear pressure coefficient increases with the cavity volume for small volumes, and then reaches a plateau as the cavity volume increases. The average rear pressure is seen to increase continuously for an increasing aperture width, with no saturation in the normalised average pressure coefficient observed. The maximum aperture width used was 5 mm, which is 2.5% of the diameter of the bluff body. Typically, trucks or LGVs can be more than 3 meters in width and height. Therefore, the aperture when the pressure drag reduction apparatus is used in combination with a bluff body such as an LGV will preferably be greater than 70 mm wide. However, the aperture width may be less than or equal to 70 mm.

Figure 5A:
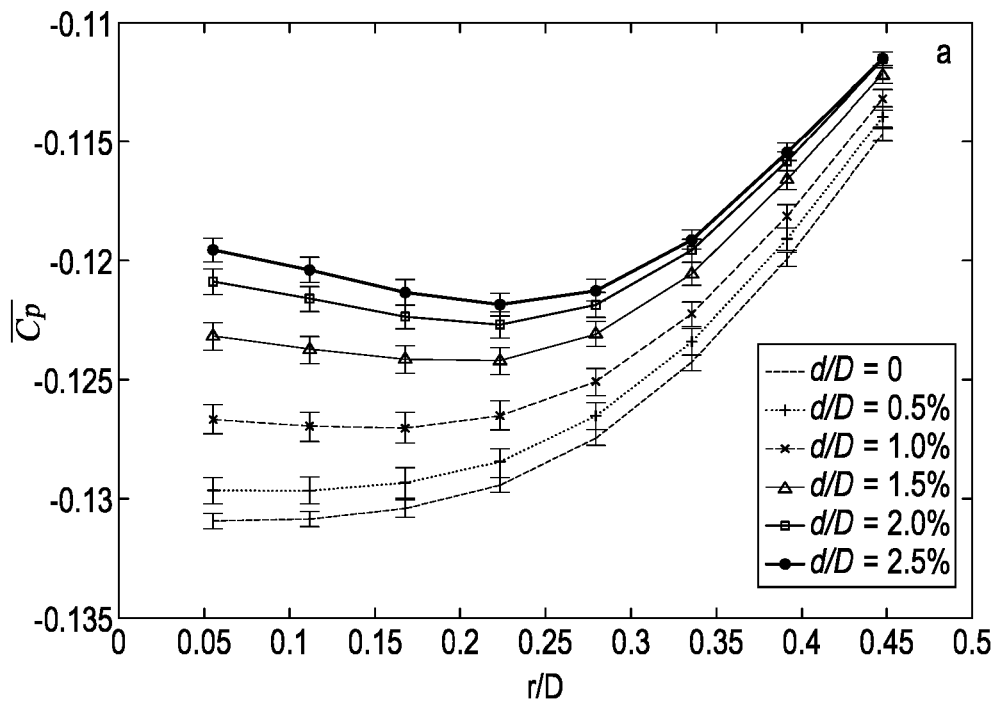
FIG. 5A is an example of a graph showing the radial distribution of the pressure at the rear of the bluff body for the first embodiment of the present invention.

FIG. 5A shows the radial distribution of the pressure coefficient average C_p for different aperture widths. The average is a temporal, azimuthal and radial average. D is the diameter of the bluff body in FIG. 1 and r is the current radial position under consideration. It can be seen that as the width of the aperture increases, the pressure coefficient average also increases. This shows a larger aperture width produces a bigger increase in the pressure at the rear of the bluff body. Therefore, a larger aperture will make a bigger contribution to the reduction in pressure drag. The pressure coefficient average C_p also varies over the radius of the bluff body, r. In general, the pressure coefficient average is higher at the edge of the bluff body (r/D=0.5) and lower at the centre of the bluff body (r/D=0). For a larger aperture width, for example d/D=2.5%, the pressure coefficient average decreases as the radius increases away from the centre of the bluff body, and increases again towards the edge of the bluff body 100. From FIG. 5A it can be seen that a larger increase in the pressure coefficient average with aperture width occurs in the centre of the bluff body 100 than at the edge.

Figure 5B:
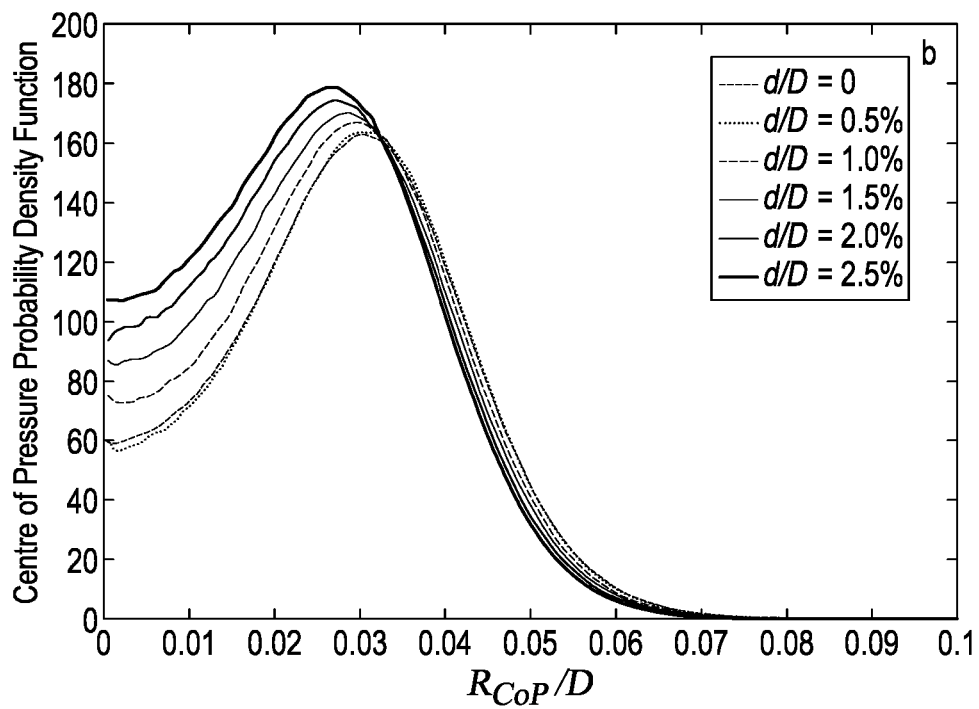
FIG. 5B is an example of a graph showing the radial distribution of the centre of pressure probability density function at the rear of the bluff body of the first embodiment of the present invention.

The mean pressure field at the rear of the bluff body 100 is calculated by averaging a series of instantaneously asymmetric pressure fields, like those observed in an unsteady laminar regime. These asymmetric fields randomly vary their azimuthal angle. FIG. 5B shows the probability density function of the instantaneous centre of pressure radius, R_CoP (i.e. the radius at which the centre of pressure occurs). The probability density functions all present a maximum at a radius R_CoP_max, which is indicative of the lack of symmetry of the instantaneous pressure fields. As seen in FIG. 5B, the centre of pressure probability density function is affected by the aperture width, d; the larger the aperture, the more likely it is that the centre of pressure is closer to the centre of the bluff body (R_CoP/D=0).

The most probable instantaneous rear pressure field can be obtained by averaging instantaneous pressure fields over time, wherein each pressure field is shifted azimuthally by the centre of pressure angle before averaging. This is equivalent to taking an average of the pressure field in a frame of reference that rotates with the centre of pressure angle. The averages were performed three times: using all the fields in each series; conditioning for only fields with the centre of pressure radii R_CoP closest to the maximum centre of pressure radius R_CoP_max; and conditioning for only those fields where the centre of pressure radii R_CoP is closer to the centre of the base of the bluff body than 0.0025D.

Figure 6:
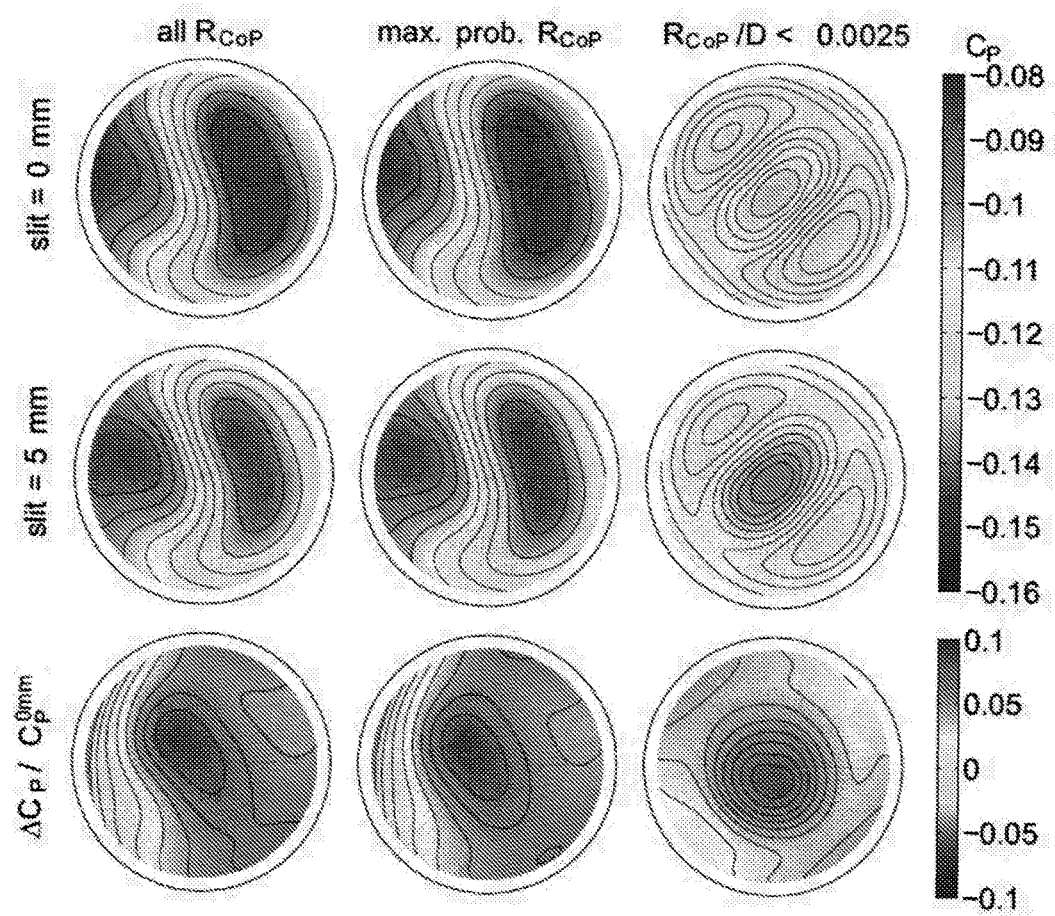
FIG. 6 is an example graph showing the pressure at the rear of the bluff body of FIG. 1 for different aperture widths.

FIG. 6 shows a comparison of these three field averages for an aperture width of 0 mm and an aperture width of 5 mm. It can be seen that there is a pronounced asymmetry in the resulting pressure field due to the instantaneous pressure field being locked at one angle in the calculation. For the larger aperture width, there is an increase in the pressure at the centre of the rear of the bluff body (around 10%), and the pressure then reduces towards the edges of the bluff body. The third row of FIG. 6 shows the difference between the fields obtained for apertures of d=5 mm and d=0 mm, weighted by the average pressure obtained for the aperture of d=0 mm.

Figure 7A:
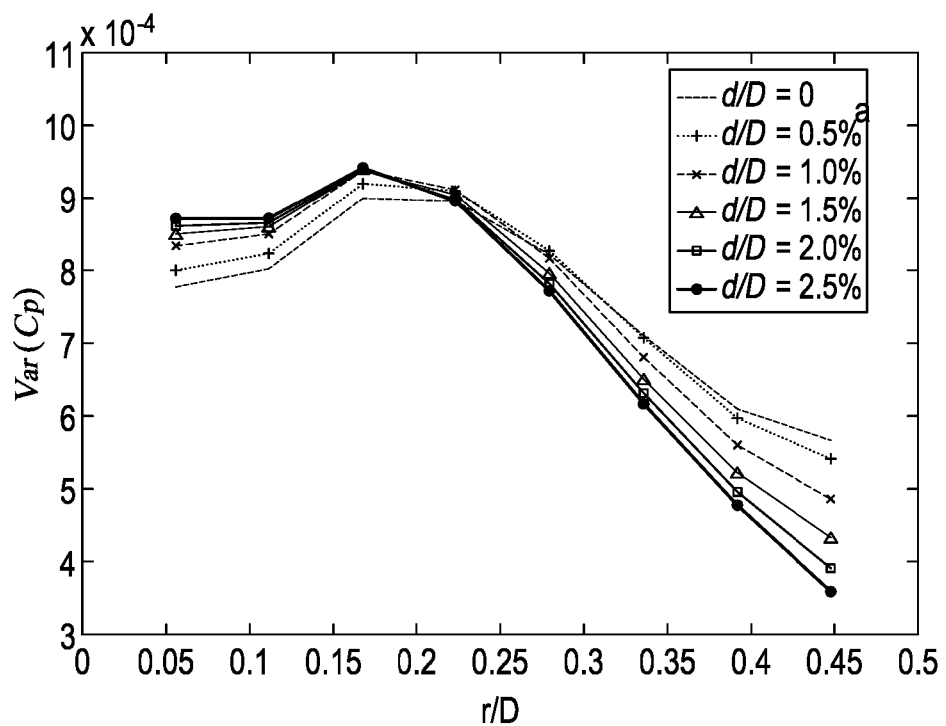
FIG. 7A is an example of a graph showing the radial distribution of the variance of the pressure at the rear of the bluff body for a range of aperture widths.
Figure 7B:
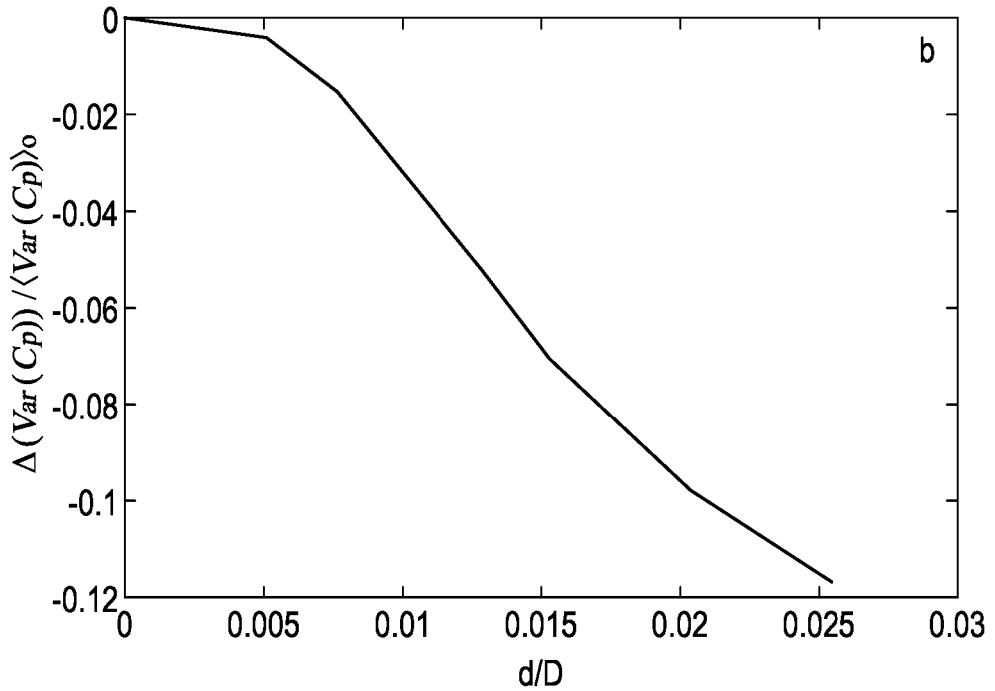
FIG. 7B is an example of a graph showing the reduction in the variance of the pressure at the rear of the bluff body with increasing aperture width.

The effect of the aperture width on the wake dynamics can be inferred from the changes in the pressure fluctuations at the rear of the bluff body when the aperture width is varied. FIG. 7A shows the radial distribution of the variance of the pressure coefficient average var(C_p) for a range of aperture widths. The effect of the aperture width on the variance of the pressure coefficient average is not radially homogenous. Pressure fluctuations increase at the centre of the rear of the bluff body and diminish near the edges of the rear of the bluff body, where the average pressure is less affected by the aperture width, as seen previously. FIG. 7B shows the relationship between the aperture width and the radial weighted spatial average of the pressure coefficient average variance. A monotonic reduction of the pressure fluctuations with increased aperture width is observed.

FIG. 8 shows the frequency content of the pressure variance at the rear of the bluff body 100 for Fourier modes 0, +/−1, +/−2 and +/−3. Results are given for aperture widths of 0 mm, 3 mm and 5 mm. The frequency content is plotted against the body diameter based Strouhal number, St_D, defined as St_D=FD/U. The Strouhal number is a dimensionless number which describes oscillating flow mechanisms. F is the frequency, D is the diameter of the bluff body (as previously discussed) and U is the free flow velocity (in this instance, 15 m/s). Above a critical speed, vortex shedding has a constant Strouhal number for any size of body which depends on the body geometry. Vortex shedding is a flow oscillating phenomenon which occurs when a bluff body such as an LGV travels through air at certain speeds. Vortices are created where the flow separates at the trailing edge of the bluff body; these vortices alternately separate from different sides of the body in a periodic motion. The frequency of this vortex shedding can cause resonance in the structure if the frequency of vortex shedding matches the resonance frequency of the bluff body.

A detailed analysis of the rear pressure fluctuations is performed by projecting the pressure field onto orthogonal spatial modes and analysing their variance content ($\phi$) at different frequencies. The graphs in FIG. 8 show that increasing the aperture width consistently reduces the random pressure fluctuations at the rear of the bluff body 100, especially the continuous wake rotation, captured by modes +/−1 and +/−2. The two periodic modes present in the pressure variance spectra are the vortex shedding, at St_D approximately equal to $2\times10^{-1}$ and a sub-harmonic at St_D approximately equal to $8\times10^{-2}$. These two periodic pressure oscillations decrease when the aperture width is increased from 0 mm to 5 mm. Thus, the vortex shedding is substantially reduced as the aperture width increases. Therefore, it can be seen that the passive drag reduction apparatus acts to attenuate the most relevant wake oscillations, either random or periodic, at the rear of the bluff body.

For the embodiment described above with reference to FIGS. 1 to 3, the average base pressure increases with the cavity volume for small volumes and saturates for a maximum volume, wherein the volume at saturation increases with the aperture width. For the smallest apertures, saturation of the pressure increase occurs before the smallest cavity volume (283 cm$^3$) while the average pressure saturates between 283 cm$^3$ and 662 cm$^3$ for the largest apertures. As described above with reference to FIG. 4A, for the largest aperture tested (d=5 mm), an increase in the cavity volume of up to 344% from a volume of 662 cm$^3$ does not lead to any increase in the average pressure. This shows that the phenomenon of pressure reduction is not a self-resonant Helmholtz mechanism, nor a local effect produced by a small recirculation cavity inside the aperture, but a global mechanism in which transport of mass is essential. Therefore, the air in the cavity needs to be in fluid communication with the environment surrounding the pressure drag reduction apparatus through the aperture. The cavity volume may preferably be designed such that pressure loss through the cavity is minimised.

The pressure drag reduction of the passive pressure drag reduction apparatus described above with reference to FIG. 1 was tested at a range of different aperture widths. The maximum aperture width tested was 2.5% of the body diameter and the narrowest aperture tested had a width of 0.5% of the body diameter. The housing 106 is located at the rear edge of the bluff body 100 and the aperture 104 communicates the external flow of fluid around the bluff body and the apparatus to the cavity 102. Therefore, the pressure drag reduction obtained by the apparatus relies on internal mass transport and produces both a global modification of the wake behind the bluff body and a global reduction of the pressure fluctuations, as described above. The aperture affects the random azimuthal rotation of the wake and the vortex shedding. In other embodiments (such as those shown in FIGS. 9 and 10 described below), the housing can be of a non-axisymmetric cross section, for example a rectilinear cross section. The pressure drag reduction apparatus can then be applied to larger bluff bodies, for example, lorries, trucks or LGVs.

The pressure drag reduction apparatus described above can be a simple and economic addition to any form of bluff body, as it can be easily retrofitted. The only cost in using the device is therefore the initial installation cost. The apparatus can also be non-protrusive, so it can be used when the shape of the body, for example an LGV or other bluff body vehicle, is subject to special requirements. Unlike traditional methods of reducing pressure drag such as boattails or trailing panels, as described in US 2002/0030384, the pressure drag reduction apparatus of the present invention does not require extensive elongation of the bluff body. Instead, the apparatus can be manufactured with a small cavity volume and a large aperture, resulting in a very small protrusion of the apparatus beyond the original trailing end of the body. Alternatively, for example, the apparatus can be designed to fit within a door of, or be otherwise incorporated into, a bluff body such as an LGV, van, 4×4 or other vehicle.

In some embodiments the bluff body itself may form the passive pressure drag reduction apparatus. The housing may be formed of the body of the bluff body, which may be a van, LGV or other vehicle. The panel may be formed of the rear doors of the vehicle. The cavity is then defined by the interior dimensions of the vehicle. The aperture may extend around the perimeter of the rear doors and the hinges typically used to secure the doors to the body of the vehicle may be the attachment means. Alternatively, other attachment means may be used. The width of the aperture may be any of the dimensions discussed above. Alternatively, the aperture may be of a different width, taking into account the necessity of, for example, keeping rain and other adverse weather out of the housing (or body of the vehicle) in this embodiment.

Figure 9:
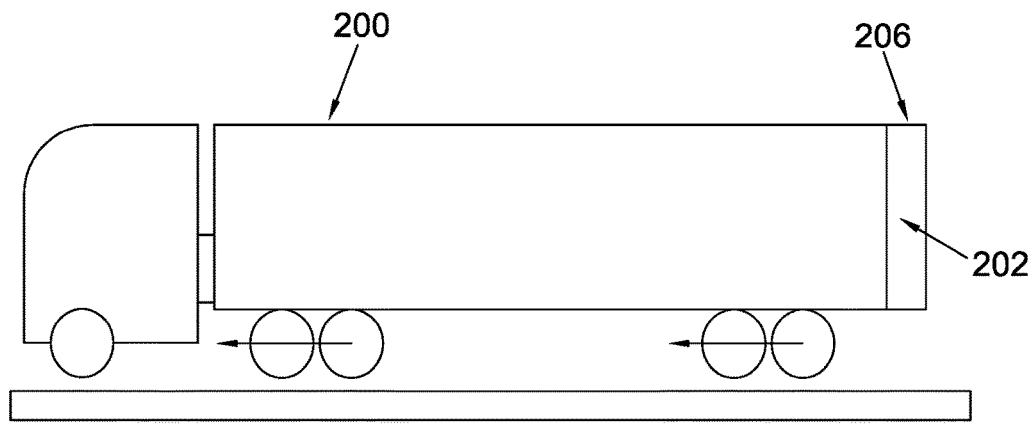
FIG. 9 shows a schematic of a vehicle and pressure drag reduction apparatus of a second embodiment of the present invention.

FIG. 9 shows another embodiment of the pressure drag reduction apparatus in which a housing 206 is coupled to an LGV 200. The housing 206 could also be coupled to a lorry or truck or other bluff body. A schematic rear view of the bluff body and pressure drag apparatus of this second embodiment is shown in FIG. 10.

Figure 10:
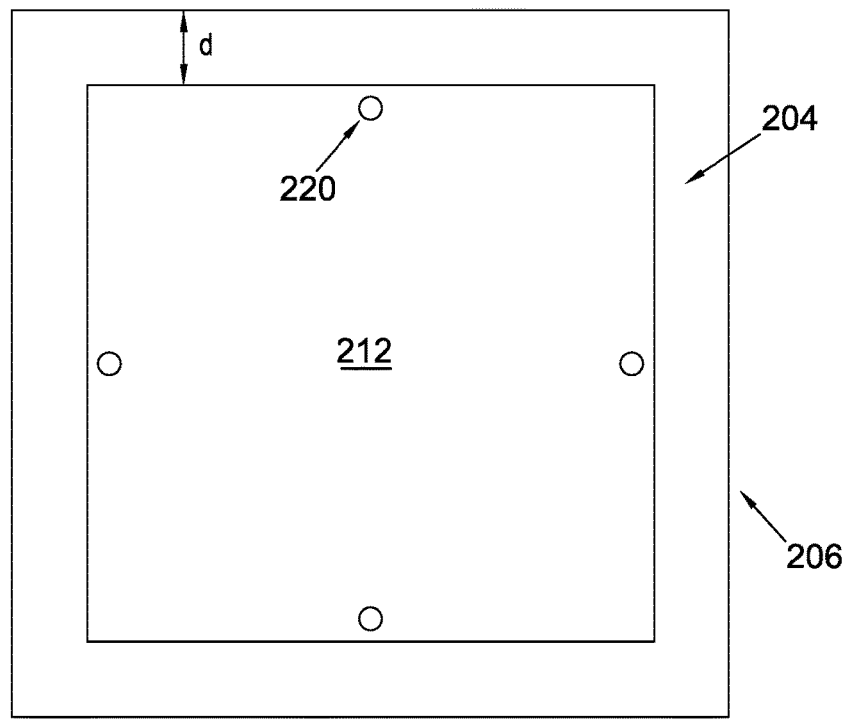
FIG. 10 shows a schematic rear view of the vehicle of the second embodiment of the present invention, illustrating the features of the pressure drag reduction apparatus coupled to the vehicle.

With reference to FIGS. 9 and 10, the housing 206 has a rectilinear cross section that substantially matches the cross section of the LGV 200. The volume of the cavity 202 defined by the housing 206, as described above with reference to FIG. 2A, is therefore in this embodiment defined by the height, width and depth dimensions of the housing 206. Preferable dimensions for the volume of the cavity are discussed below. A panel 212 is secured to the housing 206 by a plurality of attachment means 220. The attachment means 220 are small screws, but in other embodiments may be screws or bolts or other fixing means suitable for securing the panel 212 to the housing 206. In this embodiment there are multiple attachment means but, in other embodiments, there may be only one attachment means securing the panel 212 to the housing 206.

The separation of the panel 212 and the housing 206 form an aperture 204 of width d. The aperture extends around the panel 212. The cavity 202 is in fluid communication with the environment surrounding the LGV 200 through the aperture 204 so, preferably, the attachment means 220 are small in cross section so as not to disrupt fluid flow through the aperture 204. The aperture 204 may be any width. However, bigger reductions in the pressure drag are gained for larger aperture sizes, as shown above. Therefore, the aperture may be equal to or greater than 2% or 2.5% of the height or width of the LGV 200, whichever is the largest lateral dimension. In some embodiments, the aperture width 204 may be greater than or equal to 3% of the greatest lateral dimension of the LGV 200 and in other embodiments, the aperture width 204 may be greater than or equal to 5% of the largest lateral dimension of the LGV 200. For the typical dimensions of the bluff bodies that the housing 206 may be coupled to, the expected proportions of the LGV 200 would result in an aperture width of 70 mm, 90 mm or 150 mm respectively. However, a reduction in the pressure drag will be achieved for any width of aperture, even an aperture width less than 70 mm. Therefore, the aperture width 204 may be less than 2.5% of the height or width of the LGV 200.

The pressure drag reduction apparatus described above with reference to FIG. 1 was tested for a range of different cavity volumes. The largest cavity volume tested was 2278 cm$^3$ and the smallest cavity volume tested was 283 cm$^3$. Evidently, this range of cavity volumes is specific to the particular geometry of this embodiment. More general boundaries on the cavity volume are described below with reference to the underlying principles of the pressure drag reduction mechanism.

Figure 11:
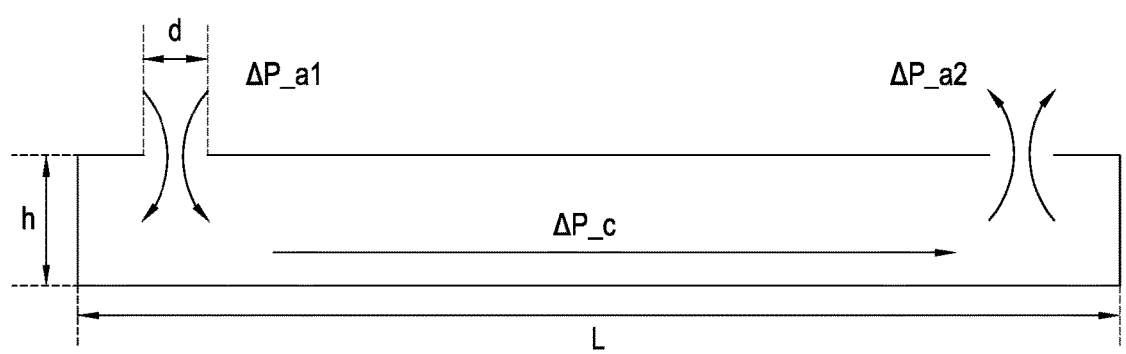
FIG. 11 shows a schematic of the change in pressure through the cavity and aperture of the pressure drag apparatus.

The drag reduction caused by the passive apparatus of the present disclosure is due to mass flow through the cavity of the apparatus, which balances out any pressure differences at the rear of the bluff body. For this transfer mechanism to be effective, it is essential that the total pressure drop experienced by the fluid passing through the cavity, $\Delta P\_total$, is minimised. The total pressure drop has three main components, as described with reference to FIG. 11: the pressure drop in a first part of the aperture, $\Delta P\_a1$, the pressure drop in a second part of the aperture, $\Delta P\_a2$, where the first and second parts of the aperture are substantially opposite one another and the pressure drop in the cavity, $\Delta P\_c$, where the housing defining the cavity has a depth h. In this example, the aperture width at the first and second parts of the aperture is equal and therefore $\Delta P\_a1 \sim \Delta P\_a2 \sim \Delta P\_a$, where $2\Delta P\_a$ represents the total pressure loss through the apertures. Therefore, $\Delta P\_total = 2\Delta P\_a + \Delta P\_c$.

To select appropriate dimensions for the main geometrical parameters involved, d, h and L (where L is the greatest lateral dimension of the housing), it is necessary to make sure that the pressure drop produced by the least critical dimension is much smaller than the pressure drop produced by the most critical dimension. The critical dimension is that which is subjected to external constraints or operational considerations, for example regulations on the length of vehicles, or the maximum slit size for pressure recovery saturation. For example, if the volume of the cavity is the most critical dimension then $\Delta P\_c >> 2\Delta P\_a$. On the contrary, if the aperture size is the most critical dimension then $\Delta P\_c << 2\Delta P\_a$. If all the dimensions are equally important, an optimal balance between the aperture size and the cavity volume can be found by fixing one dimension and calculating the other using the above ratios.

The total pressure drop across the system for a bluff body (such as an LGV or truck) combined with the apparatus of the present disclosure may typically be of the order of $0.1*P\_dynamic$, where $P\_dynamic$ is the dynamic pressure and is defined as $P\_dynamic = \rho(U\_bb)^2/2$, where $U\_bb$ is the speed of the bluff body and $\rho$ is the air density. $\Delta P\_a$ can be estimated based on a typical contraction-expansion valve, and is of the order of $\Delta P\_a \sim \rho(U\_a)^2/2$, where $U\_a$ is the velocity of the fluid through the aperture. $\Delta P\_c$ can be estimated as the pressure drop in a viscous conduit, and is the order of $\Delta P\_c \sim (\rho(U\_c)^2/2)*fL/D\_h$, where $U\_c$ is the flow velocity in the cavity, f is the friction coefficient (which can be found from a Moody chart or diagram) and $D\_h$ is the hydraulic cavity diameter (which can be found for each particular geometry of housing). For uncompressible flows, there is a kinematic relationship between $U\_c$ and $U\_a$ (for example, $U\_c = U\_a*d/h$).

Consequently, the relationship between the different geometrical parameters can be estimated as:

$$0.1*\rho(U\_bb)^2/2 = \Delta P\_total = 2\Delta P\_a + \Delta P\_c,$$

where the equations for $\Delta P\_a$ and $\Delta P\_c$ given above can be substituted in to give:

$$0.1*\rho(U\_bb)^2/2 = 2\rho(U\_a)^2/2 + (\rho(U\_c)^2/2)*fL/D\_h.$$

For the arrangement of bluff body and apparatus described above with reference to FIGS. 9 and 10, for which $U\_c = U\_a*d/h$, and assuming that the aperture width is the most critical parameter, $\Delta P\_c << 2\Delta P\_a$. Assuming a vehicle speed of $U\_bb = 60$ mph, the velocity of air through the cavity can be estimated at $U\_c \sim 5$ m/s. Therefore, using all of the above approximations, the relationship between the geometrical parameters is: $2\rho(U\_a)^2/2 >> (\rho(U\_a*d/h)^2/2)*fL/D\_h$.

As described above, $D\_h$ can be calculated and f can be found from a Moody diagram. Assuming a fluid velocity through the aperture of $U\_a = 2$ m/s, and using $D\_h = 2h$ and $f = 0.03$, the required dimension for the parameter h can be defined as $h >> (Ld^2/133)^{(1/3)}$. For an aperture width of 70 mm and a truck dimension of 3 m, as described above, this gives a resultant value of $h >> 48$ mm. Therefore, the optimum volume of the cavity for this geometry of apparatus can be defined as being preferably much greater than 0.432 m$^3$. More preferably, h is in the range of 100 mm to 200 mm. In the particular design described, this results in a cavity volume between 0.9 m$^3$ and 1.8 m$^3$. For different geometries of bluff body and housing, the optimal cavity dimensions can be seen to vary as a function of the aperture width, as described with reference to the above equations. Alternatively, where operational considerations such as the length of the vehicle restrict the cavity volume, the aperture width can be calculated as above, but using the ratio of $\Delta P\_c >> 2\Delta P\_a$.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination. It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The invention claimed is:

1. A passive pressure drag reduction apparatus comprising:
    a housing comprising a base face, an open top face opposite the base face and at least one side face extending between the base face and the top face, wherein the base face, the top face and the at least one side face define a cavity;
    a panel aligned with the top face of the housing;
    an aperture extending around the panel, wherein the cavity is in fluid communication with an environment surrounding the apparatus via the aperture;
    attachment means arranged to secure the panel to the housing.

2. The apparatus of claim 1, wherein the base face is rectilinear and the housing comprises four sides extending between the base face and the top face.

3. The apparatus of claim 1 or 2, wherein the aperture has a width greater than or equal to 2% of a largest lateral dimension of the housing.

4. The apparatus of claim 3, wherein the aperture width is greater than or equal to 3% of the largest lateral dimension of the housing.

5. The apparatus of claim 1, wherein the housing comprises a body of a bluff vehicle and the panel is integrated within one or more doors of the bluff vehicle.

6. A vehicle comprising the passive pressure drag reduction apparatus of claim 1.

7. The vehicle of claim 6, wherein the base face of the housing is arranged at a rear of the vehicle with respect to the usual direction of travel of the vehicle.

8. The vehicle of claim 6, wherein the apparatus is arranged such that the side faces of the housing are substantially flush with edges of the rear of the vehicle.

9. The vehicle of claim 6, wherein the apparatus is arranged such that the aperture lies in a plane substantially perpendicular to the direction in which fluid would usually flow over the vehicle.

10. The vehicle of claim 6, wherein the vehicle is a large goods vehicle.

11. A method of reducing the pressure drag on a vehicle, comprising:
    providing a passive pressure drag reduction apparatus on a rear of a vehicle, the apparatus comprising:
        a housing comprising a base face, an open top face opposite the base face and at least one side face extending between the base face and the top face, wherein the base face, the top face and the at least one side face define a cavity,
        a panel aligned with the top face of the housing,
        an aperture extending around the panel, wherein the cavity is in fluid communication with an environment surrounding the apparatus via the aperture,
        attachment means arranged to secure the panel to the housing; and
    arranging the vehicle such that fluid flows over the vehicle in a direction substantially perpendicular to a plane in which the aperture of the apparatus lies to reduce the pressure drag on the vehicle.

* * * * *